US008809422B2

(12) United States Patent
Lienert et al.

(10) Patent No.: US 8,809,422 B2
(45) Date of Patent: Aug. 19, 2014

(54) EPOXY RESIN CURING INDICATOR COMPOSITION

(75) Inventors: Klaus Wilhelm Lienert, Hamburg (DE); Marco Busi, Mantova (IT); Nataly Colombi, Sala Breganza (IT); Alberto Pederzani, Parma (IT); Paola Gherardi, Parma (IT)

(73) Assignee: Elantas GmbH, Wesel (DE)

( * ) Notice: Subject to any disclaimer, the term of this patent is extended or adjusted under 35 U.S.C. 154(b) by 0 days.

(21) Appl. No.: 13/391,964

(22) PCT Filed: Aug. 26, 2010

(86) PCT No.: PCT/EP2010/062504
§ 371 (c)(1),
(2), (4) Date: May 1, 2012

(87) PCT Pub. No.: WO2011/029733
PCT Pub. Date: Mar. 17, 2011

(65) Prior Publication Data
US 2012/0225187 A1 Sep. 6, 2012

(30) Foreign Application Priority Data

Sep. 11, 2009 (EP) .................................... 09170006

(51) Int. Cl.
*C08L 63/00* (2006.01)
*C08G 59/50* (2006.01)
*C08L 71/00* (2006.01)

(52) U.S. Cl.
CPC ................. *C08G 59/50* (2013.01); *C08L 63/00* (2013.01); *C08L 71/00* (2013.01)
USPC ............ 523/400; 116/206; 427/8; 427/407.1; 427/230

(58) Field of Classification Search
None
See application file for complete search history.

(56) References Cited

U.S. PATENT DOCUMENTS

| 3,030,329 | A | * | 4/1962 | Warnsdorfer, Jr. ............ 523/453 |
| 3,157,633 | A | | 11/1964 | Kuhn |
| 3,773,706 | A | * | 11/1973 | Dunn, Jr. ........................ 528/62 |
| 4,009,063 | A | | 2/1977 | Wood |
| 4,069,191 | A | * | 1/1978 | Post ............................... 523/461 |
| 4,160,064 | A | * | 7/1979 | Nodiff ........................... 428/413 |
| 4,193,905 | A | | 3/1980 | Audykowski et al. |
| 4,284,729 | A | | 8/1981 | Cross et al. |
| 4,499,246 | A | | 2/1985 | Tesson et al. |
| 5,017,258 | A | | 5/1991 | Brown et al. |
| 5,091,474 | A | | 2/1992 | Murakami et al. |
| 5,274,054 | A | | 12/1993 | Moser et al. |
| 6,258,191 | B1 | * | 7/2001 | Fasano et al. .............. 156/89.12 |
| 7,019,101 | B2 | * | 3/2006 | Xia ................................. 528/44 |
| 7,820,772 | B2 | | 10/2010 | Usui et al. |
| 2007/0244268 | A1 | | 10/2007 | Usui et al. |

FOREIGN PATENT DOCUMENTS

| DE | 2336353 | | 2/1974 |
| EP | 329456 | | 8/1989 |
| EP | 507735 | | 10/1992 |
| EP | 1731545 | | 12/2006 |
| GB | 1571457 | | 7/1980 |
| JP | 56036540 | | 4/1981 |
| JP | 2000309733 | | 11/2000 |
| WO | 9412988 | A1 | 6/1994 |
| WO | 2005030853 | A1 | 4/2005 |
| WO | WO 2005/030853 | A1 * | 4/2005 |

OTHER PUBLICATIONS

Database WPI Week 198122 Thomson Scientific, London, GB; AN 1981-38770D XP002578363.
Database WPI Week 200122 Thomson Scientific, London, GB; AN 2001-213252 XP002578364.
"Lackadditive" by Johan Bieleman, pp. 351 to 357, Wiley-VCH, 1998.
Roempp Lexikon, 9th edition, pp. 1369 to 1370, Thieme, 1990, keyword "Flammschutzmittel".
Roempp Lexikon—Lacke and Druckfarben, pp. 83 to 85, keyword "Brandschutzmittel", Thieme, 1998.

* cited by examiner

*Primary Examiner* — William Phillip Fletcher, III
(74) *Attorney, Agent, or Firm* — Abel Law Group, LLP

(57) ABSTRACT

Compositions comprising at least one epoxy resin and/or reactive diluents, at least one hardener for the at least one epoxy resin, at least one curing indicator, wherein the color of the composition changes depending on the curing degree, a process for determining sufficient cure of a composition comprising providing a composition comprising at least one epoxy resin and a hardener for the epoxy resin, adding a curing indicator, applying curing conditions to the colored composition until the composition changes its color and use of polymeric colorants as curing degree indicator, wherein the curing indicator is a polymeric colorant consisting of chromophores which are chemically bound to polymers having reactive groups.

19 Claims, No Drawings

EPOXY RESIN CURING INDICATOR COMPOSITION

This application claims priority to European application 09 170 006.2 filed on Sep. 11, 2009. The entire disclosure of the prior application is considered to be part of the disclosure of the instant application and is hereby incorporated by reference.

Any of the documents cited herein are incorporated by reference in their entirety.

FIELD OF THE INVENTION

The present invention relates to cured epoxy resins, which have various uses in the engineering, construction, electrical insulation, pipe relining, coating, tooling, composites and structural adhesives. The mixture which is cured changes the colour depending on the degree of cure and contains a curing indicator.

BACKGROUND OF THE INVENTION

Epoxy resins are utilised in many applications, like coating materials, electrical insulating materials, adhesives, structural reinforcements because the cured material has excellent mechanical, electrical, thermal properties, good chemical resistance and adhesion properties. Epoxy resin systems are generally supplied as two components. One is the resin and the other the hardener. Both must be mixed before use. The mixed components have a limited shelf life and cure. They can not be stored.

Properties of the cured materials can be changed through the formulation of the epoxy resin or of the hardener. For what regards epoxy resins a large variety of resins containing liquid epoxy resins based on reaction product of bisphenol A with epichlorohydrine are formulated with reactive diluents, bisphenol F resins, epoxy Novolaks, plasticizers, toughening agents, fillers to impart specific properties in terms of thermal resistance, chemical resistance, mechanical and electrical properties, flame resistance, thermal conductivity, etc.

The cured mixtures must be tested for complete curing via measurement of glass transition temperature (Tg) or heat distortion temperature (HDT) via differential scanning calorimetry (DSC), thermo mechanical analysis (TMA), dynamic mechanical analysis (DMA), dielectric properties, mechanical properties which are laborious methods, mainly if curing is done in field conditions, like curing of an epoxy adhesive for tube liners.

As curing agents that are effective at ambient temperature or moderate temperatures the state of the art are amines with more than one primary or secondary amine group. Curing of the epoxy resins can also be done via a homopolymerization. In this case catalysts e.g. based on tertiary aliphatic amines, salified amines, imidazoles, are used.

In EP 329 456 aromatic polynuclear aromatic diamines were claimed as hardeners for epoxy resins. Curing is monitored via Tg.

Various substituted 1,3-diaminopropanes can be used as hardeners for epoxy resins like described in GB 1 571 457. Tg is used to prove the curing.

Because polyamines are difficult to handle, have unpleasant odors and sometimes are hazardous substances, sometimes derivatives of the amines are used as hardeners. DE 23 36 353 describes the use of the reaction product of aliphatic diamines with methyl caprolactame as aminic hardener. Mechanical values were used to characterise the cured material. EP 1 731 545 describes the use of the reaction product between an epoxy resin and methylimidazol as aminic hardener. EP 507 735 describes the use of the reaction product of cycloaliphatic or heterocycloaliphatic diamines with polyfunctional epoxy resins as aminic hardeners. Mechanical properties and Tg were use to control curing. Epoxy formulations containing latent catalysts derived from salification of tertiary amines are another possible class of usable products. U.S. Pat. No. 4,449,246 describes one with particular reference to powder coating.

Organic colourants known can be of low or high molecular weight. Polymeric colourants are known, and were described e.g. in U.S. Pat. No. 4,284,729. They are based on a polymeric constituent derived from polyalkylene oxides or its copolymers reacted with dyestuff radicals. These polymeric colourants are reported to have reactive groups on the end of the molecules to be able to covalently bond to the polymeric matrix to be dyed.

U.S. Pat. No. 3,157,633 describes several methods to produce them and their use as fugitive dyes in several applications related to textiles. These reactive polymeric dyes are used to colour polymeric material. The dyes have the capability to bond to the matrix.

Several cases are reported of colour changes of these dyes as consequences of variations of pH. This is a main drawback in their use. To overcome this, specific structures were designed as in U.S. Pat. No. 7,019,101.

Several applications can benefit from a simple way to detect the curing of epoxy resins. Among them pipe relining represents a relevant case due to the difficulties in assessing the proper cure of pipe laying below the level of the floor/street.

U.S. Pat. No. 4,009,063 describes the process of pipe rehabilitation through the insertion of a liner which is impregnated with thermosetting resins, mainly polyester or epoxy based resins. Curing starts by thermal, UV or other activation. Still the most preferred is the thermal activation for its simplicity. Many products based on different epoxy system compositions are available on the market for repairing damaged pipes. They cover different needs in terms of reactivity and final properties. U.S. Pat. No. 5,017,258 describes a typical epoxy system used in this field to balance a long pot-life with a fast curing at moderate temperature.

From U.S. Pat. No. 3,030,329; WO 94/12988, WO 2005/030853 and JP 56036540 compositions are known that use triaryl compound-based dyes to indicate the mixing and gel-state of epoxy resins.

OBJECT OF THE INVENTION

It was an object of the instant invention to provide compositions, especially epoxy based compositions, whereby the curing degree can be assessed easily and without the need for a sophisticated laboratory. The curing degree should preferably be assessable with the naked eye, ideally by a colour change.

It further was an object of the instant invention to provide an indicator for the degree of curing, especially for epoxy based compositions, which does not require the use of a sophisticated laboratory.

SUMMARY OF THE INVENTION

The objects of the instant invention have been achieved by compositions comprising at least one epoxy resin and/or reactive diluents, at least one hardener for the at least one epoxy resin, a curing indicator, wherein the hardener for the epoxy resin is no acid and no anhydride, and wherein the composition changes its colour depending on the curing degree of the composition, a process for determining sufficient cure of a composition comprising providing a composition comprising at least one epoxy resin and a hardener for the epoxy resin, adding a curing indicator, to the composition, applying curing conditions to the coloured composition until the composition changes its colour and the use of polymeric colourants as curing indicators to indicate the degree of curing of compositions.

DEFINITION OF TERMS

Any indications of parts/quantity given in the instant invention are to be considered as indications of parts/quantity by weight, if not specified otherwise. In the instant invention the term "room temperature" is intended to mean a temperature of 20° C.; if not specified otherwise, temperature values are to be considered as degrees centigrade (° C.).

In the instant invention are the given reactions or process steps are carried out at normal pressure/atmospheric pressure, that is at 1013 mbar.

In the instant invention the term "curing degree" or "degree of curing" is to be understood as an expression of how far the curing reaction has proceeded between its start (where no reaction at all has taken place) and its end (where the reaction has proceeded as far as possible, the system being fully cured then). Furthermore, this term is known in the art and needs no further explanation.

In the context of the instant invention the term "sufficient cure" means a curing degree, which is defined by the respective artisan using the invention, as he desires for the respective application, and can thus vary.

Usually and in preferred embodiments of the instant invention the term "sufficient cure" is equivalent to "fully cured" or "complete curing", i.e., the curing reaction cannot proceed any further, as this usually is the desired curing degree.

DETAILED DESCRIPTION

In the instant invention formulations, which change their colour during the curing process, based on epoxy resin(s) that cure with hardeners, in particular with aminic systems, and additionally containing curing indicators, which are polymeric dyes, were found. Thus a cheap and effective control of the curing degree of epoxy-based compositions was found. The system according to the instant invention is mainly useful in field applications, where no sophisticated laboratory equipment is available to verify that the epoxy system is fully cured.

In principle any known epoxy resins can be used in the instant invention.

In one embodiment of the instant invention the epoxy resins to be used are selected from the group consisting of epoxy glycidylether of bisphenol A, epoxy glycidylether of bisphenol F, multifunctional epoxy Novolak resins and mixtures thereof.

According to the instant invention the epoxy resins can be blended with one or more reactive diluents selected from the group consisting of monofunctional epoxy diluents including cresyl glycidylether, various alkyl glycidylethers, bifunctional epoxy diluents including butanediol diglycidylether, hexanediol diglycidylether, neopentylglycol diglycidylether, polypropylene glycol diglycidylether, multifunctional epoxy diluents including trimethylolpropane triglycidylether, epoxydized castor oil, epoxydized soy bean oil, epoxy acrylate derivatives and mixtures thereof.

In one embodiment of the instant invention the epoxy components are selected from the group consisting epoxy glycidylether of bisphenol A, epoxy glycidylether of bisphenol F, butanediol diglycidylether, hexanediol diglycidylether, trimethylolpropane triglycidylether, epoxydized soy bean oil and mixtures thereof.

Curing agents, which are usable as hardeners in the instant invention are in principle any of those known in the art for the curing of epoxies.

In the instant invention the hardeners for the epoxies are not acids and not their anhydrides.

In one embodiment of the instant invention the hardeners are selected from the group consisting of hardeners based on aliphatic, cycloaliphatic, heterocyclic, aromatic amines, polyaminoamides, their adducts with epoxy derivatives and mixtures thereof.

In one embodiment of the instant invention the amines are selected from the group consisting of polyethylene amines, isophorone diamine, polyether amines and mixtures thereof.

Most preferred aminic components are polyoxypropyleneglycole triamines and diamines, isophorone diamine and mixtures of.

In one embodiment of the instant invention the hardeners/curing agents are used in a deviation from the stoichiometric ratio, with respect to the epoxy groups present in the epoxy resin, of +/−20%, preferably +/−10%, more preferably +/−5%. In one embodiment, the hardeners/curing agents are used in a stoichiometric ratio, with respect to the epoxy groups present in the epoxy resin.

In the instant invention catalysts for the homopolymerisation of the epoxy resins can also be used as hardeners. In one embodiment they are selected from tertiary amines or its salts.

In one embodiment they are selected from the group consisting of benzyldimethylamine, 2,4,6-tris(dimethylaminomethyl)phenol, their salts with 2-ethylhexanoic acid and mixtures thereof.

In another embodiment the catalysts are selected from the group consisting of dimethylbenzyl amine, 2,4,6-tris(dimethylaminomethyl)phenol, tri 2-ethylhexanoate of 2,4,6-tris(dimethylaminomethyl)phenol, 1-methylimidazole and mixtures thereof.

Accordingly, in the instant invention the term "hardener" can encompass curing agents, particularly those described above, or catalysts for the homopolymerisation, particularly those described above, or both.

The instant invention's compositions can contain toughening agents. They are preferably selected from the group consisting of functionalized rubbers, liquid rubbers, grafted silicones to epoxy, hybrid epoxy-PU, hybrids of epoxy-acrylates and mixtures thereof. Preferred toughening agents are selected from the group consisting of functionalized rubbers, liquid rubbers and mixtures thereof.

The epoxy resin system of the instant invention can be formulated including thixotropic additives or fine particle fillers to control the rheology of the entire system. Usable examples are selected from the group consisting of fumed silica, bentonite derivatives, silico-aluminate particles and nanoparticles and mixtures thereof.

Additives to improve surface finishing or adhesion to different substrates can be added to the epoxy resin systems to fulfil specific needs, without affecting the final results in terms of traceability of the curing through colour variation. According to the instant invention they can be selected from the group consisting of air release, wetting agents, defoamers, coupling agents and mixtures thereof. These are examples of such substances, typically used in the field to reach these targets.

The epoxy resin formulations can contain non-reactive substances acting as plasticisers, including various phthalates, high boiling alcohols, liquid hydrocarbon resins, organic carbonates, various diols and high boiling esters. Preferred plasticizers are selected from the group consisting of benzyl alcohol, polypropylene glycol, phthalates and mixtures thereof.

Inorganic or organic fillers can also be used in the instant invention's epoxy formulations. They are of various particle sizes, depending on use. These materials are preferably selected from the group consisting of carbonates, quartz, alumina hydrates, silico-alluminates, phenolic resins, acrylic resins and mixtures thereof. More preferably fillers are selected from the group consisting of aluminium hydroxide, calcium carbonate, quartz and mixtures thereof.

Furthermore, flame retardants can be added to the instant invention's epoxy formulations, with the proviso that they are compatible with epoxy resins.

Examples are given in the book "Lackadditive" by Johan Bieleman, pages 351 to 357, Wiley-VCH, 1998 and in Römpp Lexikon, $9^{th}$ edition, pages 1369 to 1370, Thieme, 1990, keyword "Flammschutzmittel, as well as in Römpp Lexikon—Lacke and Druckfarben, pages 83 to 85, keyword "Brandschutzmittel", Thieme, 1998, though in principle any other flame retardants compatible with epoxy resins can be used, also.

According to the instant invention a colour-changing curing indicator is added to the epoxy/hardener system to monitor the curing of the system.

The curing of the system is monitored by the colour change that happens during the curing. During curing, the colour of the system changes from a first colour which is the result of the mixture of the colour-changing curing indicator with the epoxy, the hardener or both, to a second colour.

This curing indicator is an organic colourant.

The curing indicator can be premixed with the hardener or with the epoxy resin. In order to monitor the curing of epoxy resins with hardeners, in particular amines, the colourant has to be stable in the epoxy resin at various temperatures. On the other hand the colourant should not react with the hardener.

The polymeric colourants employed in the instant invention consist of chromophores which are chemically bound to polymers having reactive groups, the polymers particularly being polyols.

Preferred examples of colourants used in the instant invention are those described in U.S. Pat. No. 3,157,633, column 1, line 67 to column 2, line 2, column 2, line 47 to 61 and column 2, line 69 to column 3, line 40 or described in U.S. Pat. No. 4,284,729, column 1, line 60 to column 2, line 38 or described in U.S. Pat. No. 7,019,101 B2 column 6, line 14 to column 8, line 42.

It is advantageous if the polymeric colourants are liquid at room temperature and show a viscosity below 5000 cps, so that they can be easily mixed with the epoxy resins and/or the gardeners.

According to the instant invention, polymeric colourants including those available under the name Reactint® supplied by Milliken were found to be particularly useful colour-changing curing indicators to monitor the curing of epoxy resins with amines and are thus preferred colourants of the instant invention.

Particularly preferred polymeric colourants according to the instant invention are selected from the group consisting of Reactint® X7473-47, Reactint® Blue 87-13, Reactint® Yellow X15 and mixtures thereof.

In one exemplary embodiment of the instant invention, the colour changes from violet to blue in case of primary/secondary amines based hardeners. In another exemplary embodiment, colour change is from blue or violet to orange/red in case of systems where tertiary amines or its salts based hardener were used.

In one embodiment of the instant invention, instead of one polymeric colourant, it is possible to employ two or more polymeric colourants as curing indicator.

If two or more polymeric colourants are used as curing indicator, they can be added to only the epoxy resin or to the hardener, or to both, whereby it is also possible to add one/some of them to the one component (epoxy or hardener) and the other(s) to the other component (hardener or epoxy).

Thus it is possible to colour both the epoxy resin and the hardener in different colours, so that they can be easily be distinguished by just looking at them. It is even possible to distinguish different epoxy or different hardeners by specific colours providing an even more sophisticated more-component system.

The only proviso is that the resulting epoxy/hardener compositions change their colour upon curing.

In one embodiment, additional binders can be added to the instant invention's systems including polyesters, polyethers, acrylates, polyurethanes.

In one embodiment of the instant invention, the compositions of the instant invention comprise
a) at least one epoxy resin and/or reactive diluents,
b) at least one hardener for the at least one epoxy resin,
c) at least one curing indicator, which is a polymeric colourant consisting of chromophores which are chemically bound to polymers having reactive groups,
wherein the hardener for the epoxy resin is no acid and no anhydride, and
wherein the composition changes its colour depending on the curing degree of the composition.

In one embodiment of the instant invention, the compositions of the instant invention additionally comprise
d) additives selected from the group consisting of toughening agents, thixotropic additives or fine particle fillers, air release, wetting agents, defoamers, coupling agents, non-reactive substances acting as plasticisers, inorganic or organic fillers and mixtures thereof.

In further embodiments of the instant invention, the compositions of the instant invention consist of
a) at least one epoxy resin and/or reactive diluents,
b) a hardener for the at least one epoxy resin, and
c) at least one curing indicator, which is a polymeric colourant consisting of chromophores which are chemically bound to polymers having reactive groups,
wherein the hardener for the epoxy resin is no acid and no anhydride, and
wherein the composition changes its colour depending on the curing degree of the composition, or
consist of
a) at least one epoxy resin and/or reactive diluents,
b) a hardener for the at least one epoxy resin,
c) at least one curing indicator, which is a polymeric colourant consisting of chromophores which are chemically bound to polymers having reactive groups, and
d) additives selected from the group consisting of toughening agents, thixotropic additives or fine particle fillers, air release, wetting agents, defoamers, coupling agents, non-reactive substances acting as plasticisers, inorganic or organic fillers and mixtures thereof,
wherein the hardener for the epoxy resin is no acid and no anhydride, and
wherein the composition changes its colour depending on the curing degree of the composition.

In one embodiment of the instant invention, the compositions of the instant invention consist of:

A 30 to 100 parts epoxy resin mixture consisting of one or more, preferably one, epoxy resin(s) or consisting of one or more, preferably one, epoxy resin(s) and one or more, preferably one, reactive diluent(s),
B 0 to 40 parts tougheners,
C 0 to 30 parts plasticizers,
D 0 to 80 parts of inorganic or organic fillers,
E 0.001 to 3 parts of curing indicator, which is a polymeric colourant consisting of chromophores which are chemically bound to polymers having reactive groups,
Fa curing agents, preferably aminic hardeners, in stoichiometric ratio with respect to epoxy groups present in the resin or with variation respect to stoichiometric ratio of +/−20% or
Fb 0.5 to 25% catalysts for homo polymerisation,
wherein the hardener for the epoxy resin is no acid and no anhydride, and
wherein the composition changes its colour depending on the curing degree of the composition.

In another embodiment of the instant invention, the compositions of the instant invention consist of:

A 50 to 100 parts epoxy resin mixture consisting of one or more, preferably one, epoxy resin(s) or consisting of one or more, preferably one, epoxy resin(s) and one or more, preferably one, reactive diluent(s),
B 0 to 30 parts tougheners,
C 0 to 20 parts plasticizers,
D 0 to 60 parts fillers,
E 0.005 to 2 parts curing indicator, which is a polymeric colourant consisting of chromophores which are chemically bound to polymers having reactive groups,
Fa curing agents, preferably aminic hardeners, in stoichiometric ratio respect to epoxy group content or variation +/−15% respect to it or
Fb from 1 to 20% catalyst for homo polymerisation,
wherein the hardener for the epoxy resin is no acid and no anhydride, and
wherein the composition changes its colour depending on the curing degree of the composition.

In yet another embodiment of the instant invention, the compositions of the instant invention consist of:

A 60 to 95 parts epoxy resin mixture consisting of one or more, preferably one, epoxy resin(s) or consisting of one or more, preferably one, epoxy resin(s) and one or more, preferably one, reactive diluent(s),
B 0 to 20 parts tougheners,
C 2 to 10 parts plasticizer,
D 0 to 50 parts fillers,
E 0.01 to 1 parts curing indicator, which is a polymeric colourant consisting of chromophores which are chemically bound to polymers having reactive groups,
Fa curing agents, preferably aminic hardeners, in stoichiometric ratio respect to epoxy group present in the resin or with variation respect to stoichiometric ratio +/−10%, or
Fb from 2 to 15% catalyst for homo polymerisation,
wherein the hardener for the epoxy resin is no acid and no anhydride, and
wherein the composition changes its colour depending on the curing degree of the composition.

It is preferred that the compositions of the instant invention which change their colour depending on the curing degree of the composition change their colour from a first colour before curing to a second colour after curing, when the composition is fully cured.

In the instant invention the phenomenon of colour change is related to the particular composition of the system and not to any fugitive effect due to temperature. The phenomenon has been proven to be particularly useful to monitor the curing of epoxy systems.

The curing indicators of the instant invention do not migrate as for example triphenylmethane dyes would.

The invention relates also to processes for the preparation of the epoxy resin compositions according to this invention by mixing the various constituents and to the use of the epoxy resin composition using the disclosed compositions.

The instant invention also relates to a process for determining sufficient, especially complete, curing of a composition comprising
i) providing a composition comprising at least one epoxy resin and a hardener for the epoxy resin,
ii) adding at least one curing indicator, which is a polymeric colourant consisting of chromophores which are chemically bound to polymers having reactive groups, to the epoxy resin, the hardener and/or the already mixed composition,
iii) applying curing conditions to the coloured composition until the composition changes its colour.

In the process according to the instant invention the compounds described above are used.

The instant invention also relates to the use of polymeric colourants as curing indicators, wherein the above described polymeric colourants are used.

A further embodiment of the instant invention relates to the use of the compositions described above for coating and casting applications and/or in pipe relining systems.

According to the instant invention, the curing degree of the epoxy systems can be monitored by the colour change of the epoxy system.

Usually and in preferred embodiments of the instant invention, only full curing is of interest and assessed and thus the colour change can be assessed with the naked eye.

It is a particular advantage of the instant invention that the colour change of the systems according to the instant invention is so clear and distinct that it can be assessed with the naked eye.

Due to this advantage it is possible to verify that the epoxy system is fully cured even in areas, where it normally is very cumbersome to verify the curing degree (with laboratory equipment), especially in pipe relining applications.

Several applications can benefit from the simple way to detect the curing of epoxy resins according to the instant invention. Among them pipe relining represents a relevant case due to the difficulties in assessing the proper cure of pipe laying below the level of the floor/street.

The various embodiments of the instant invention, including those of the dependent claims, can be combined with each other in any desired manner.

The invention will now be explained by way of the following non-limiting examples.

EXAMPLE 1

Curable Epoxy Composition 1

An epoxy formulation containing 80 parts of liquid bisphenol A resin (Epikote 828EL) with 15 parts of butanediol diglycidylether and 5 parts of benzyl alcohol was prepared and homogenised. As hardener 99.8 parts of tri 2-ethylhexanoate of 2,4,6-tris(dimethylaminomethyl)phenol, 0.2 parts of Reactint blue X7473-47 were used. The hardener was blue. 100 parts of the epoxy formulation were mixed with 5 parts of the hardener described. The mixture was initially light blue but it turned to orange after curing for 2 hours at 80° C. or for 4 hours at 70° C. The Tg of 79° C., measured via differential scanning calorimetry (DSC model Perkin Elmer Pyris 6; ASTM D 3418-82) indicated full curing.

EXAMPLE 2

Curable Epoxy Composition 2

A resin was obtained by mixing 75 parts of liquid bisphenol A resin (DER 331) with 10 parts of liquid bisphenol F resin (Epikote 862) and 15 parts of hexanediol diglycidylether. The obtained mixture was carefully homogenized avoiding air trapping. As hardener according to this invention a mixture of 99.8 parts of benzyl dimethylamine and 0.2 parts of Reactint blue 87-13 was prepared. The hardener was violet. 100 parts of epoxy formulated resin described were mixed with 5 parts of hardener. The mixture was initially blue-violet but it turned to orange after curing for 2 hours at 80° C. or for 4 hours at 70° C. The Tg of 85° C., measured via DSC (ASTM D 3418-82) indicated full curing.

EXAMPLE 3

Curable Epoxy Composition 3

An epoxy formulation was prepared by mixing 80.99 parts of liquid bisphenol A resin (DER 331) with 5 parts of butanediol diglycidylether, 10 parts of $C_{13}$-$C_{15}$-glycidylether, 4 parts of benzyl alcohol and 0.01 parts of Reactint blue 87-13. The mixture was carefully homogenized avoiding air trapping. The final product was light blue. The hardener was a polyoxypropylene glycol triamine (Jeffamine T-403 form Huntsman). 100 parts of epoxy formulated resin was mixed with 45 parts of hardener. The mixture was initially violet and it turned to blue after curing at room temperature or for 2 hours at 80° C. The Tg of 54° C. measured via DSC (ASTM D 3418-82) indicated full curing.

EXAMPLE 4

Thermal Stability of the Coloured Hardener from Example 1

The hardener was prepared according to the composition of example 1. After 5 hours at 70° C. no change of colour has been observed so the combination was thermally stable for the curing period. After heating the hardener at 70° C. for 60 hours only a small change of tone from blue to green-blue was observed.

EXAMPLE 5

Thermal Stability of the Coloured Hardener from Example 2

The hardener was prepared according to the composition of example 2. After 5 hours at 70° C. no change of colour was observed. The hardener was thermally stable. After 60 hours at 70° C. only a small change of colour from violet to violet-red occurred.

EXAMPLE 6

Curable Epoxy Composition 6

An epoxy formulation according to example 1 was prepared. A hardener was prepared according to the composition of example 1. The hardener was aged for 60 hours at 70° C. turning to green-blue. 100 parts of epoxy formulated resin described in example were mixed with 5 parts of hardener. The mixture was initially blue-green but it turned to orange after curing for 2 hours at 80° C. or 4 hours at 70° C. The Tg of 79° C., measured via DSC (ASTM D 3418-82) indicated full curing.

EXAMPLE 7

Curable Epoxy Composition 7

An epoxy mixture was formulated according to example 2. The hardener was aged according to example 5, that means aging was done for 60 hours at 70° C. 100 parts of epoxy resin formulation were mixed with 5 parts of hardener. The mixture was initially violet-red but it turned to orange after curing for 2 hours at 80° C. or for 4 hours at 70° C. The Tg of 85° C., measured via DSC (ASTM D 3418-82) indicated full curing.

EXAMPLE 8

Curable Epoxy Composition 8

75 parts of liquid bisphenol A resin (DER 331) were mixed with 10 parts of liquid bisphenol F resin (Epikote 862), 15 parts of hexanediol diglycidylether and 0.01% of Reactint blue 87-13. The obtained blue mixture was carefully homogenized avoiding air trapping. The hardener was pure 1-methylimidazole. 100 parts of the epoxy resin formulation were mixed with 5 parts of hardener. The mixture was initially blue but it turned to dark-red after curing for 6 hours at 90° C. The Tg of 128° C. measured via DSC (ASTM D 3418-82) indicated full curing.

EXAMPLE 9

Epoxy System for Pipe Relining 9

The formulation described in example 1 was used to impregnate a felt liner. The liner was inserted in the pipe. The system impregnated-felt-liner-pipe was cured for 2 hours at 80° C. Proper cure of the system was shown by the evident change of colour from blue to orange.

EXAMPLE 10

Epoxy System for Pipe Relining 10

An epoxy formulated product as described in example 7 was filled with 50% of aluminium hydroxide. The obtained dispersion was treated under vacuum at 20 mbar for 20 minutes to eliminate trapped air. The resulting product was light blue. The hardener used was tri 2-ethylhexanoate of 2,4,6-tris (dimethylaminomethyl)phenol. 100 parts of epoxy formulation were mixed with 3 parts of hardener. The mixture was initially light blue but it turned to orange after curing for 2 hours at 80° C. or 4 hours at 70° C. The Tg of 80° C., measured via DSC (ASTM D 3418-82) indicated full curing.

What is claimed is:
1. A curable epoxy resin composition comprising:
  (a) at least one epoxy resin;
  (b) at least one curing agent for the at least one epoxy resin; and
  (c) at least one polymeric colorant curing indicator that comprises one or more chromophores chemically bonded to a polymer having one or more reactive groups, wherein the curing agent is not an acid or an acid anhydride, wherein the polymeric colorant imparts color to the composition and indicates the curing state of the composition, and wherein the color of the composition changes as a function of its curing state.

2. The composition of claim 1, wherein (b) comprises an aminic hardener.

3. The composition of claim 1, wherein (b) comprises one or more hardeners selected from the group consisting of aliphatic amines, cycloaliphatic amines, heterocyclic amines, aromatic amines, polyaminoamides, and adducts thereof with epoxy group containing compounds.

4. The composition of claim 1, wherein (b) comprises one or more materials which catalyze a polymerisation of (a).

5. The composition of claim 1, wherein the polymer having one or more reactive groups is a polyol.

6. The composition of claim 1, wherein (a) comprises at least one epoxy resin selected from the group consisting of glycidyl ether of bisphenol A, glycidyl ether of bisphenol F, and a multifunctional epoxy Novolac resin.

7. The composition of claim 1, wherein (a) further comprises at least one epoxy group containing reactive diluent.

8. The composition of claim 7, wherein the at least one epoxy group containing reactive diluent comprises at least one diluent selected from the group consisting of cresyl glycidyl ether, alkyl glycidyl ethers, butanediol diglycidyl ether, hexanediol diglycidyl ether, neopentylglycol diglycidyl ether, polypropylene glycol diglycidyl ether, trimethylolpropane triglycidyl ether, epoxidized castor oil, epoxidized soy bean oil, and epoxy acrylate compounds.

9. The composition of claim 1, further comprising one or more additives selected from the group consisting of one or more toughening agents, thixotropic agents, fine particle fillers, air release agents, wetting agents, defoamers, coupling agents, plasticizers, inorganic fillers, and organic fillers.

10. The composition of claim 1, comprising

A from 30 to 100 parts of at least one epoxy resin, optionally in combination with at least one epoxy group containing reactive diluent B from 0 to 40 parts of at least one toughening agent, C from 0 to 30 parts of at least one plasticizer, D from 0 to 80 parts of at least one inorganic or organic filler, E from 0.001 to 3 parts of curing indicator (c).

11. The composition of claim 10, wherein the composition further comprises at least one aminic hardener in stoichiometric ratio +/−20% with respect to the epoxy groups present in A.

12. The composition of claim 10, wherein the composition further comprises from 0.5 to 25% of one or more compounds which catalyze a polymerization of A.

13. The composition of claim 1, comprising

A from 60 to 95 parts of at least one epoxy resin, optionally in combination with at least one epoxy group containing reactive diluent B from 0 to 20 parts of at least one toughening agent, C from 2 to 10 parts of at least one plasticizer, D from 0 to 50 parts of at least one inorganic or organic filler, E from 0.01 to 1 part of curing indicator (c).

14. The composition of claim 13, wherein the composition further comprises at least one aminic hardener in stoichiometric ratio +/−10% with respect to the epoxy groups present in A.

15. The composition of claim 13, wherein the composition further comprises from 2 to 15% of one or more compounds which catalyze a polymerization of A.

16. A method of forming a coating or a casting on a substrate, comprising coating or casting a material of the composition of claim 1 onto a substrate.

17. A method of relining a pipe, comprising applying, as relining material for the pipe, the composition of claim 1.

18. A method for determining a cure state of a composition which comprises at least one epoxy resin and at least one hardener for the epoxy resin, wherein the method comprises:

(i) combining the epoxy resin, the hardener, or a mixture thereof, with at least one polymeric colorant curing indicator that comprises one or more chromophores chemically bonded to a polymer having one or more reactive groups, wherein the polymeric colorant imparts color to the composition and indicates the curing state of the composition; and (ii) subjecting the resultant mixture of (i) to curing conditions until the mixture changes its color.

19. The method of claim 18, wherein the polymer having one or more reactive groups is a polyol.

* * * * *